Dec. 5, 1967   G. H. ARNOLD   3,356,903
AIR-COOLED ELECTRICAL APPARATUS
Filed Nov. 9, 1966   3 Sheets-Sheet 1

United States Patent Office 3,356,903
Patented Dec. 5, 1967

3,356,903
AIR-COOLED ELECTRICAL APPARATUS
George Henry Arnold, Havant, England, assignor to The General Electric Company Limited, London, England, a British company
Filed Nov. 9, 1966, Ser. No. 594,310
Claims priority, application Great Britain, Nov. 10, 1965, 47,769/65
3 Claims. (Cl. 317—100)

ABSTRACT OF THE DISCLOSURE

An electrical apparatus in which components requiring to be cooled are carried on a ducted member projecting perpendicularly from the front panel of the apparatus. Air from the surrounding atmosphere is drawn through the ducted member via an opening in the front panel by a fan mounted at the end of the ducted member remote from the front panel. The front panel and ducted member form an integral structure surrounded by a casing to form a hermetically sealed compartment through which the ducted member extends.

BACKGROUND OF THE INVENTION

1. *Field of the invention*

Electrical apparatus comprising a plurality of components mounted on a chassis in which the components are cooled by a flow of air.

2. *Description of the prior art*

In a known form of air cooled electrical apparatus at least some of the components of the apparatus are mounted on a planar chassis member which is hollow to provide a duct through which the cooling air is passed

SUMMARY OF THE INVENTION

It is an object of the present invention to provide an electrical apparatus of the foregoing character which is so constructed that the components mounted on the hollow chassis member are housed in a hermetically sealed compartment.

According to the present invention an air cooled electrical apparatus includes a plurality of electrical components mounted on an integral structure comprising a first generally planar part which constitutes the front panel of the apparatus and; a second generally planar part of heat conducting material which extends generally perpendicular to said first part and is hollow so as to provide a duct which at one end is in register with an opening in the first part; a hollow cylindrical casing which at one end is hermetically sealed to the front panel and at the other end is hermetically sealed to the end of the duct remote from the front panel, thereby to form a hermetically sealed compartment through which said hollow part of said structure extends; means for mounting at least some of said components in said sealed compartment in good thermal contact with said hollow part of said structure; and at least one electric fan which is mounted on said hollow part of the structure at the end of the duct remote from the panel, and which in operation causes air drawn from the surrounding atmosphere to pass through said duct and said opening in the front panel and be discharged to the atmosphere, the air passing through said duct carrying away heat from said components mounted in good thermal contact with said hollow part of said structure.

Figure 1:
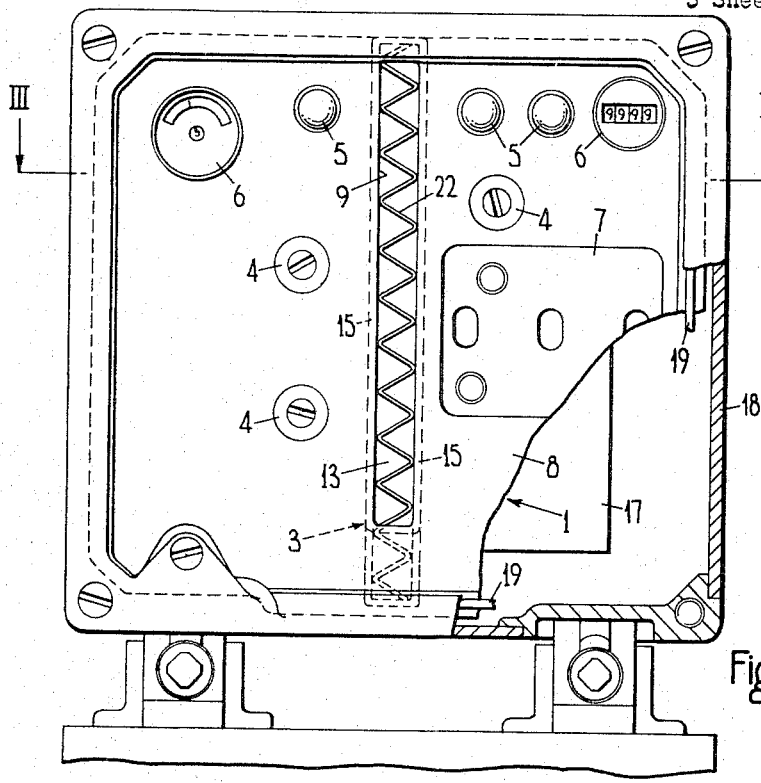
Figure 2:
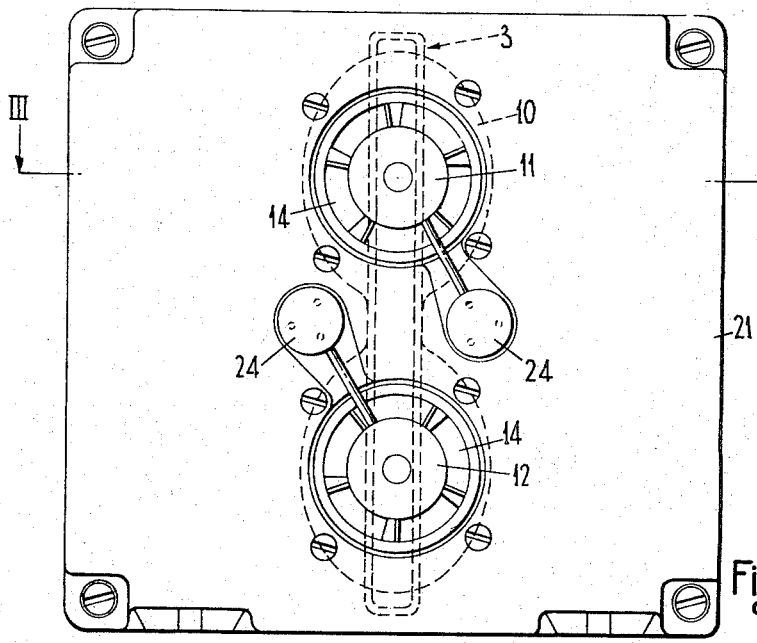
Figure 3:
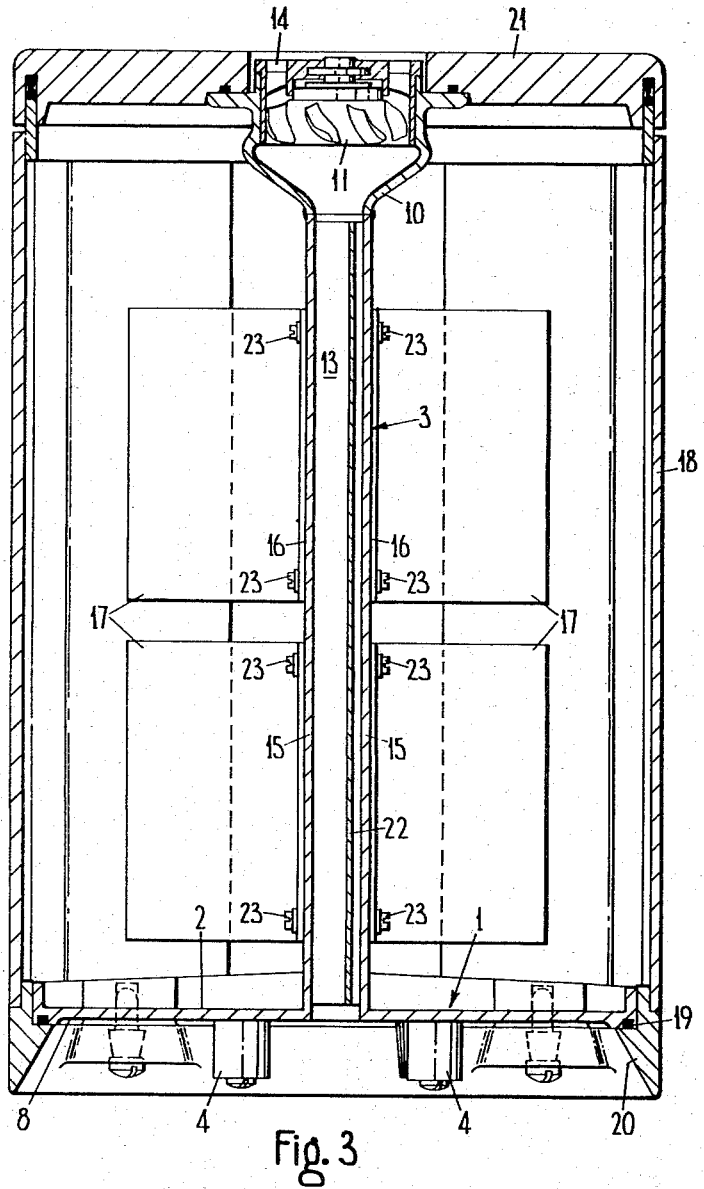
Figure 4:
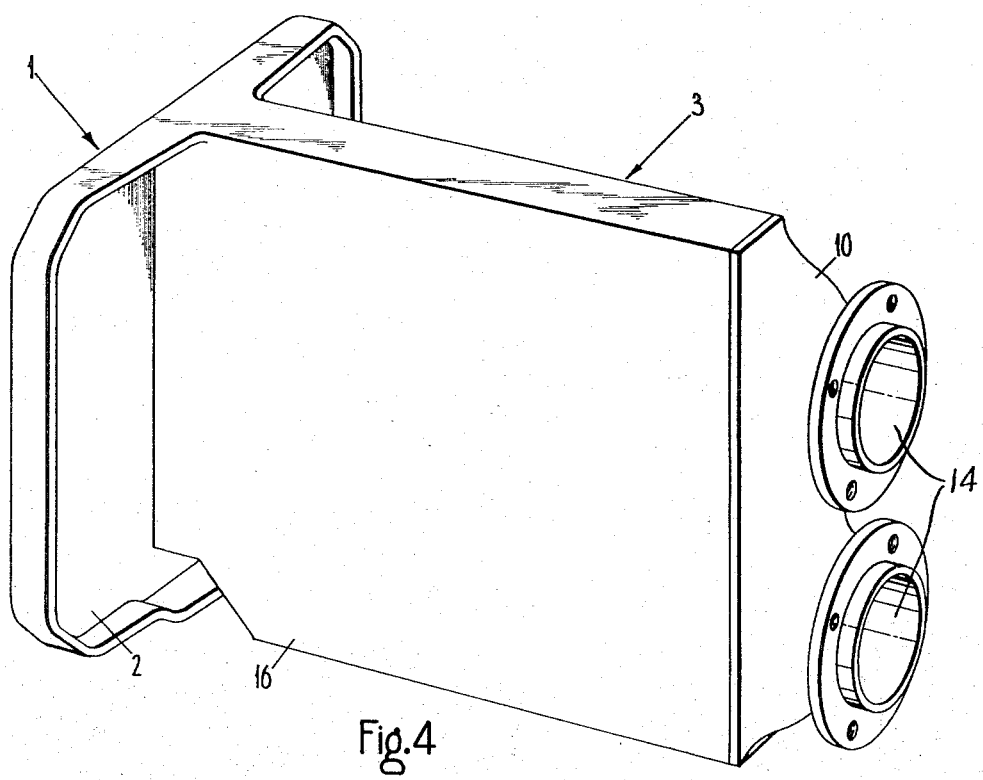

One construction of radio apparatus in accordance with the invention will be described by way of example with reference to the accompanying drawings in which FIGURE 1 shows a front end elevation of the apparatus partly broken away, FIGURE 2 shows a rear end elevation of the apparatus, FIGURE 3 shows a section at the lines III—III in FIGURES 1 and 2, and FIGURE 4 shows a perspective view of part of the apparatus.

The apparatus is in fact a radio transceiver and, referring now to the drawings, incorporates a metal chassis which essentially comprises a flat rectangular panel 1 from the face 2 of which projects a relatively thick limb 3. The panel 1 and the limb 3 together form a T-shaped structure which is most clearly seen in FIGURE 4.

The other main face 8 of the panel 1 carries controls 4 by means of which the transceiver is operated, indicator lamps 5, meters 6, and a connector 7 by means of which the transceiver may be connected with other apparatuses, for example power supplies, an aerial feeder, a microphone etc.

The limb 3 is of rectangular cross section and is hollow (see FIGURES 1 and 2), the panel 1 being sealed to one end of the limb 3 with a slot 9 which passes through the panel 1 in register with the opening at that end of the limb.

At its end remote from the panel 1, the interior of the limb 3 opens into a housing 10 to which that end of the limb is secured, the housing 10 accommodating two electric fans 11 and 12. During operation the fans 11 and 12 cause air from the surrounding atmosphere to be drawn in through the slot 9 in the panel 1, to flow through the duct 13 provided by the limb 3, and to be returned to the atmosphere via opening 14 at the rear of the housing 10. Electric current is supplied to the fans 11 and 12 by way of two "plug and socket" connectors 24.

All the individual electric components, or sub-assemblies of such components, of the transceiver, other than those previously mentioned as being mounted on the panel 1, are mounted on and in good thermal contact with the outer main faces 16 of the walls 15 of the limb 3 which is of aluminum. (These items are shown diagrammatically in FIGURES 1 and 3 by the "boxes" 17 and have been omitted in FIGURE 4.) The components represented by the "boxes" 17 are secured to the limb 3 by means of screws 23 which pass into tapped blind holes in the walls 15. (To ensure that these holes do not pass right through the walls 15, the thickness of these walls may be locally increased in the region of each tapped hole.)

The chassis formed by the panel 1 and the limb 3, together with the components mounted thereon and the fans 11 and 12, is housed in a hollow rectangular casing 18. At one end the casing 18 is closed by the panel 1, a resilient ring 19 being clamped between the panel 1 and a shoulder 20 of the casing 18 to provide a hermetic seal. An end member 21 fits over the other end of the casing 18 so as to provide hermetic seals both to the casing 18 and to the housing 10.

The apparatus thus effectively comprises a hermetically sealed compartment, which is divided into two sections by the hollow limb 3 of the chassis, and all the components of the transceiver other than those on the panel 1, are mounted on and in good thermal contact with the limb 3. Thus, apart from those mounted on the panel 1, all the components or component sub-assemblies of the transceiver have at least one surface which is cooled in operation due to the passage of air from the surrounding atmosphere through the duct 13, the components at the same time being sealed off from the surrounding atmosphere.

Wires interconnecting the components, or sub-assemblies, represented by the "boxes" 17 and the items 4, 5, 6 and 7 that are mounted on the panel 1 lie wholly within the sealed compartment. These wires form no part of the invention and accordingly, for simplicity, are not shown in the drawings.

In order to increase the effective internal surface of the limb 3 to give improved cooling, a metal member 22 which is of zig-zag form and which is in good thermal contact with the walls 15 may be provided within the duct 13 as shown in FIGURES 1 and 3.

I claim:

1. An electrical apparatus comprising: a plurality of electrical components; an integral structure on which said components are mounted comprising: a first generally planar part which constitutes the front panel of the apparatus and; a second generally planar part of heat conducting material which extends generally perpendicular to said first part and is hollow so as to provide a duct which at one end is in register with an opening in the first part; a hollow casing which at one end is hermetically sealed to the front panel and at the other end is hermetically sealed to the end of the duct remote from the front panel, thereby to form a hermetically sealed compartment through which said hollow part of said structure extends; and means for mounting at least some of said components in said sealed compartment in good thermal contact with said hollow part of said structure; and at least one electric fan which is mounted on said hollow part of the structure at the end of the duct remote from the panel, and which in operation causes air drawn from the surrounding atmosphere to pass through said duct and said opening in the front panel and be discharged to the atmosphere, the air passing through said duct carrying away heat from said components mounted in good thermal contact with said hollow part of said structure.

2. An electrical apparatus according to claim 1 wherein said integral structure and said fan form a unit which is removable from said hollow cylindrical casing.

3. An electrical apparatus according to claim 2 wherein said fan is mounted within the duct provided by said hollow part of the integral structure.

References Cited

UNITED STATES PATENTS

| 2,158,979 | 5/1939 | Breisch | 317—100 X |
| 2,912,624 | 11/1959 | Wagner. | |
| 3,048,374 | 8/1962 | Hughes. | |
| 3,123,743 | 3/1964 | Perlmutter. | |

ROBERT S. MACON, *Primary Examiner.*

ROBERT K. SCHAEFER, *Examiner.*

M. GINSBURG, *Assistant Examiner.*